United States Patent [19]
Ouellette et al.

[11] Patent Number: 5,816,821
[45] Date of Patent: Oct. 6, 1998

[54] BILINGUAL EDUCATIONAL DOLLS

[76] Inventors: Lucy Andria Ouellette; Todd Richard Ouellette, both of 69-81 108 St., Forest Hills, N.Y. 11375

[21] Appl. No.: 538,857

[22] Filed: Oct. 4, 1995

[51] Int. Cl.[6] .................................................. A63H 3/00
[52] U.S. Cl. ........................... 434/157; 434/156; 434/308
[58] Field of Search .................................... 434/156, 157, 434/308, 309, 167, 168, 322, 323, 335; 446/175

[56] References Cited

U.S. PATENT DOCUMENTS

| | | |
|---|---|---|
| 3,593,433 | 7/1971 | Dillon . |
| 3,638,351 | 2/1972 | Kasicki et al. . |
| 4,589,138 | 5/1986 | Milner et al. ...................... 446/175 X |
| 4,696,653 | 9/1987 | McKeefery .............................. 446/175 |
| 4,846,693 | 7/1989 | Baer ........................................ 434/308 |
| 5,004,442 | 4/1991 | Lemelson . |
| 5,059,149 | 10/1991 | Stone . |
| 5,092,810 | 3/1992 | Kwan . |
| 5,096,451 | 3/1992 | Smith . |

*Primary Examiner*—Richard J. Apley
*Assistant Examiner*—Glenn E. Richman

[57] ABSTRACT

A series of bilingual educational dolls that aid in teaching children additional languages. Each doll has characteristics and costume depicting a specific recognizable Nation and each Nation is represented by both male and female figures. Provided with each doll is an accessory containing an interactive sound transmitting and recording device. Prerecorded music with educational song lyrics are synchronized with the recording mechanism and are sung in the American English language then immediately repeated in a second language corresponding to the Nation being depicted by the characteristics and costume of doll.

1 Claim, 3 Drawing Sheets

BILINGUAL EDUCATIONAL DOLLS

BACKGROUND—FIELD OF INVENTION

This specification relates to a series of bilingual educational dolls employing an interactive sound transmitting and recording device along with pre-recorded music and bilingual educational lyrics synchronized to enable child participation and facilitate teaching additional languages to children.

DESCRIPTION OF PRIOR ART

Original second language teaching techniques were limited to teacher/student verbal communication with written supplemental materials, thereafter evolving to various methods including audio magnetic tapes for home use. Schools, libraries and book stores currently provide such materials to assist adults in learning additional languages common to their National heritage, for social value or possible career advancement. While it is appreciated that these are effective methods for adult learning, word association and sentence content levels cannot easily be deciphered or retained by children. Current statistics as reported by the United States Bureau of the Census reveals that millions of immigrants have been legally admitted into the United States, thus creating a need for educational change. The bilingual educational division of the Education Department has responded to this growing need with grants to Dual Language Enrichment Programs. These programs provide a two language curriculum for grades pre-kindergarten through elementary school with the primary goal of teaching both immigrant and native American children to become fluent in a second language. Unfortunately, with Federal and State agencies just beginning to extend grants, thousands of children across the United states cannot currently enjoy the cultural exchange or benefits gained by such programs.

Commercially available are dolls that utter cries, sounds and short phrases. Incorporated by reference, U.S. Pat. No. 3,638,351 granted to Kosicki, discloses a Dual Action phonetic Doll with the ability to cry.

U.S. Pat. No. #5,096,451 issued to Smith, Davidson and Hart describes a Toy Mermaid with Voice Unit capable of singing while in water. Although innovative, these specific dolls, as is the case with other dolls and toys rely on interior voice unit devices producing often inaudible or metallic sound. When such devices containing a single recording is permanently secured within a doll, sound generation is minimal and over a short period of time the same production of response words or phrases are repeated resulting in limited educational information.

Dolls and figurines dressed in National costume are generally manufactured in limited edition and distributed through mail order or specialty shops. It is known that dolls in National costume representing various cultures are of special interest to avid collectors. Said dolls and figurines are frequently made of expensive porcelain materials with hard painted details making them recognized as collector's items suitable or display and therefore prohibitive in price for most families.

OBJECTS AND ADVANTAGES

The principal object of the present specification is to provide a means to facilitate teaching additional languages to children. Other objects and advantages are:

* To provide a comprehensible means of interaction that is rewarding and stimulating.
* To provide a method of teaching that retains the interest of children.
* To Provide dolls that emit audible and educational information.
* To introduce native American children to music and lyrics representative of various Nations, as well as introduce immigrant children to music and lyrics of the American English language.
* To provide structured teaching progression that adapts to the learning ability of the child.
* To enable children to identify costumes specific to various Nations.
* To provide unique dolls that are educational, entertaining and inexpensive to manufacture.

Additional objects and advantages will become apparent from the ensuing description and drawings.

DRAWING FIGURES

In the illustrations, closely related figures have the same number but different alphabetic suffixes.

REFERENCE NUMERALS IN DRAWINGS

| | |
|---|---|
| 10 | Torso |
| 20 | Limbs |
| 30 | Head, Hair and Face |
| 40 | Costume |
| 50 | Accessory Exterior |
| 60 | Audio Components |
| 70 | Audio Cartridge |
| 80 | Written Material |
| 90 | Activating Buttons |
| 100 | Power Unit |

Sections I II and III

| | |
|---|---|
| 110 | Cartridge compartment |
| 120 | Amplifier/Speaker |
| 130 | Resistor |
| 140 | Diode |
| 150 | Relay |
| 160 | Transistor |
| 170 | Electrolic Capacitor |
| 180 | Potentiometer |
| 190 | Led |
| 200 | Jumper Pins |
| 210 | Switching Device |
| 220 | IC Timer |

DESCRIPTION—FIGS. 1 TO 3

Figure 1A:
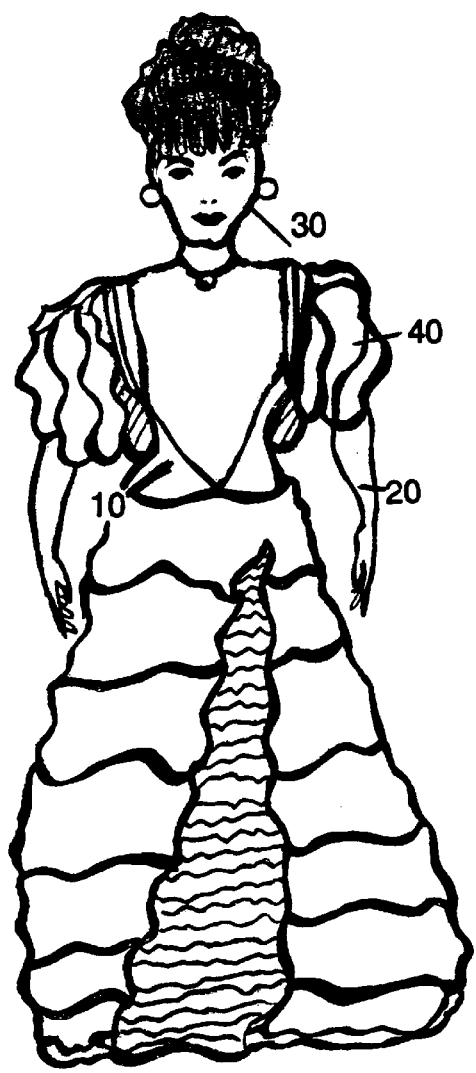
FIGS. 1A to 1C show front, side and back view of dolls each having different characteristics and costume to depict a specific Nation.
Figure 1B:
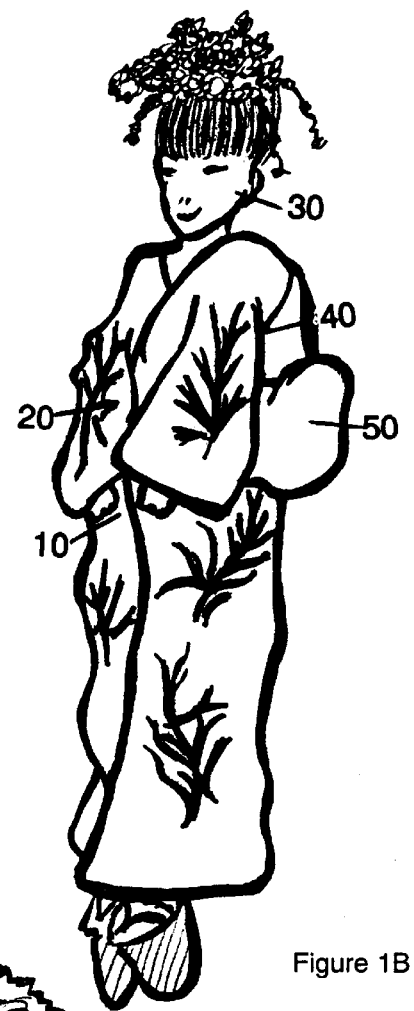
Figure 1C:
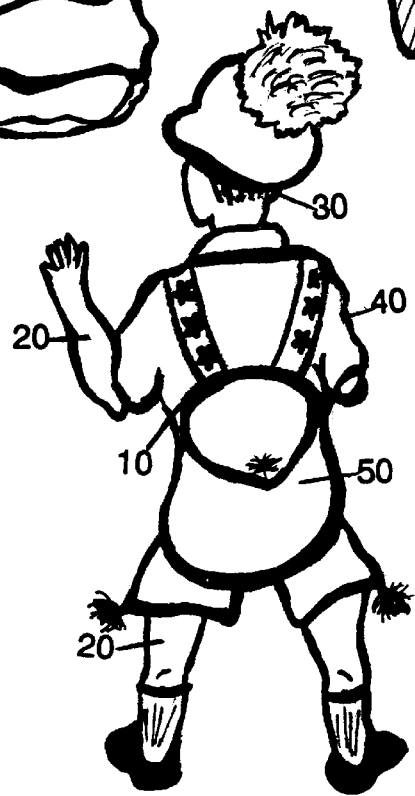

FIGS. 1A to 1C illustrate three in a series of dolls, each depicting sample characteristics and costume of a specific recognizable Nation. Each doll is equipped with an Accessory (50) containing an interactive sound transmitting and recording device (60), pre-recorded music with bilingual lyrics (70) and Written Material (80). Each Nation depicted is preferably represented by both male and female figures. The Torso (10) uniform throughout the series, has a hollow interior, is approximately fourteen inches in height and is shaped like a young child. The skin tone is preferably tinted to conform with that of the specific Nation being depicted and may be constructed of vinyl, plastic or semi-rigid material having molded sockets to join Limbs (20) and Head (30). The Limbs (20), proportioned and molded to fit the Torso (10), may be jointed to enable alternate positions. The Head (30), proportioned and molded to fit the Torso (10), may be fitted to pivot thereon. Simulated hair (30) is preferably colored and textured to conform with each specific Nation being depicted and may be bonded or rooted onto the scalp portion of the Head (30). The facial portion of the Head (30), is of basic human structure with uniform non-descript features throughout the series however, to economically achieve facial characteristics that vary with each Nation being depicted, various methods such as P.V.D. Rotational Molding or Tampo Printing may be utilized. The Costumes (40), complete with headdress, footwear and accessories, are made of cotton, simulated silk, fabrics or materials selected in color and design to closely resemble costumes of specific Nation or Region being depicted as worn by children during festive or traditional events.

Figure 2A:
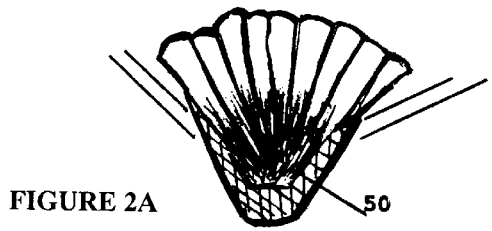
FIGS. 2A to 2E show Accessory exterior variations.
Figure 2B:
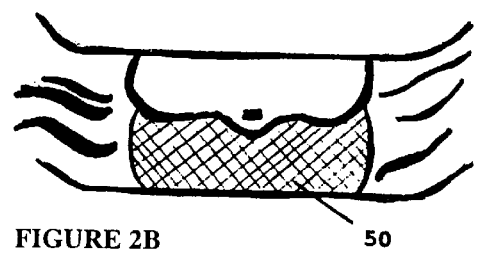
Figure 2C:
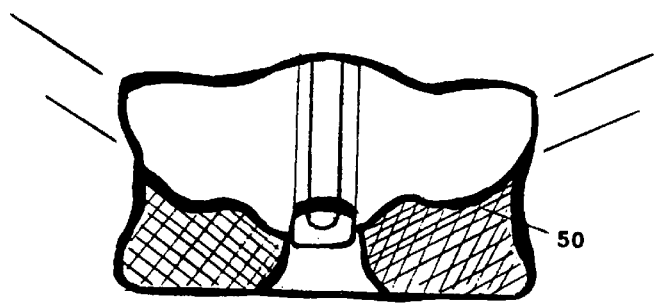
Figure 2D:
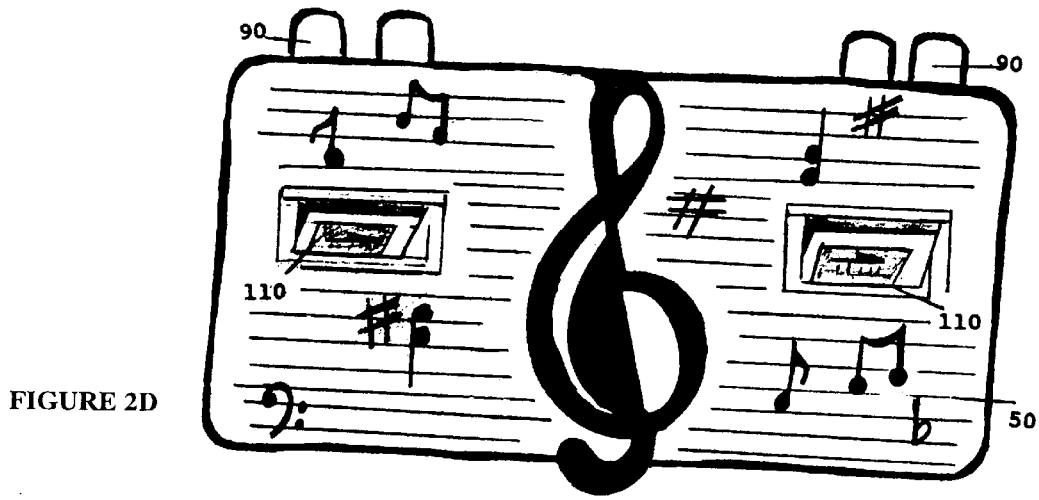
Figure 2E:
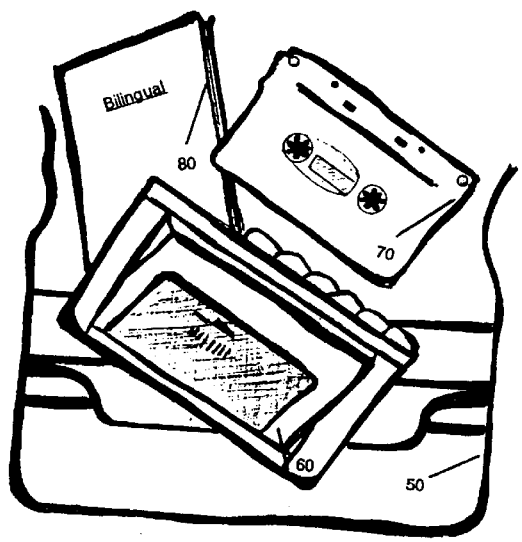
Figure 3:
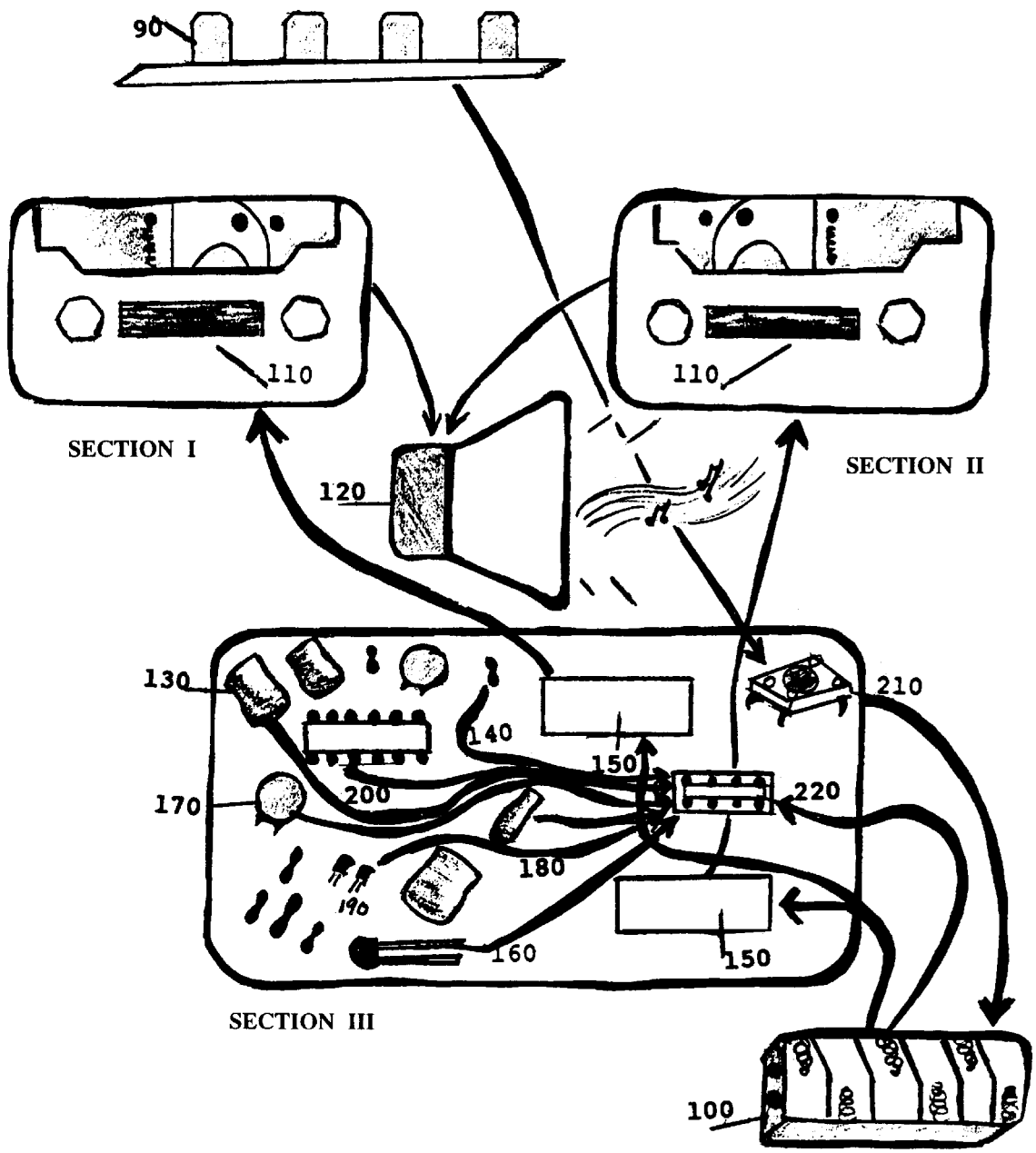
FIG. 3 (Sections I, II and III) shows Accessory interior.

FIGS. 2A to 2D illustrate variations of the Accessory exterior (50) which serves as housing for the Audio Components (60, 70, Sections I, II and III) and Written Material (80); constructed from durable lightweight plastic, the Accessory exterior (50) may be fitted with metal corner links or molded edges to fasten flexible straps for attachment to upper back portion of doll and the front panel grille is made to accommodate two audio cartridge compartments (110, Sections I and II). Decorative cutouts of musical notes and symbols maintain a musical theme and provide necessary ventilation that also ensures clear sound projection from the Audio Components (60, 70, 120) within. The Accessory exterior (50) is overall consistent in color and design with the costume worn by each doll and to further depict a specific Nation may vary as illustrated; the Accessory for the Spanish female doll (FIG. 1A) may be formed in the shape of a large fan (FIG. 2A). The obi (waistband) worn as part of the Japanese female Costume (FIG. 1B) may serve as the Accessory (FIG. 2B) while the German male doll (FIG. 1C) may simply wear a backpack (FIG. 2C) that blends well in design with the suspenders of his specific costume. Economical considerations however would allow modification to the Accessory exterior where construction throughout the series may uniformly be rectangular in shape, approximately 5½"W×5"H×3½"D (FIG. 2D). The Accessory exterior rear lower portion is fitted with power unit compartment (100) made to accommodate a plurality of batteries arranged in series to produce a maximum energizing intensity of approximately nine volts. For easy access, audio component activating and control buttons (90) protrude across the top section exterior and are connected by means of wire to the rear power unit to control the current flow that activates the interior Audio Components (60, 70, Sections I, II and III). FIG. 3 (Section , II and III) illustrates the Accessory interior which is structured with multiple sized platforms to secure the Audio Components (60, 70) fitted therein. The primary component in Section III is a linear 556 integrated timer circuit comprised of a silicon chip installed in a fourteen pin mini dual-in-line package (220) or its equivalent having two distinct output states; high voltage close to positive supplying voltage (on) and low, near ground potential (off). The dual mechanisms in Sections I and II are controlled in pre-determined time intervals by the integrated timer circuit in Section III (220) and are synchronized by means of alternating activation. Pre-determined time intervals are determined by resistor (130) and capacitor (170) values to determine timing alternations of, in this example, five second intervals. The integrated timer circuit (220) is assembled onto a circuit board with a switching device that is used for effecting the completion and rapid interruption of contacts (210), resistors (130), electrolic capacitors (170), transistor (160), diodes (140), leds (190), a potentiometer (180), jumper pins (200) and relays (150). Wire connection from the power supply unit (100) through the switching device (210) activates both relays (150) to control the flow of energy to alternately activate the Audio Components in Sections I and II. The integrated timer circuit (220) discharge pin initially keeps the capacitor discharged, this causes the integrated timer circuit output pin to stay at zero volts, which keeps the relays off. When the power supply is on, the timer switching device activates the relay connected to the Audio Components in Section I to the on position. Simultaneously, the short across the capacitor is removed and the capacitor begins to charge through the resistor. The integrated timer circuit threshold pin monitors the voltage across the capacitor as it rises, when the voltage across the capacitor exceeds the voltage at the control voltage pin, the discharge pin shorts the capacitor to ground discharging the voltage in the capacitor the integrated timer circuit output pin reduces to zero volts, simultaneously shutting off the relay and allowing the pre-determined time interval pause. The second relay is simultaneously activating alternating on/off intervals to the Audio Components in Section II.

Sections I and II contain dual recording/reproduction components (110) consisting of two distinct motors, electromagnetic recording/reproduction heads, self inducting coil, a microphone, loud speaker and amplifier equipment (120) all of which when activated operate in unison. When current is supplied to the timer components in Section III, the switching device (210) activates both relays to control the components in Sections I and II to alternately record and/or emit sound signals from magnetic medium (70). The magnetic medium (70) is comprised of a plastic tape coated with a mixture of powdered iron oxide and binder substance. Sound converted into electrical signals by means of a microphone in conjunction with amplifier equipment is recorded onto the magnetic medium which is magnetized along its length in accordance with the signals impressed on it. The magnetized medium (70) is wound onto a plastic cartridge sized to fit the Accessory exterior cartridge compartment (110) and is structured with clamps, hubs, pressure pad and guide roller mechanically capable of feeding magnetized medium across the reproduction/recording heads in Sections I and/or II to the amplifier equipment (120) to emit sound signals from magnetized medium (70); "Tape A". Tape A is proved with pre-recorded information on side one and/or side two and its cartridge exterior is tabbed to prevent alteration Information pre-recorded onto Tape A is instructional and consists of music with bilingual educational lyrics sung with an emphasis on precise diction. Song segments are pre-recorded in synchronized five second segments continuously throughout Tape A for approximately fifteen minutes having each song sung first in the American English language then immediately repeated in a second language corresponding to the Nation being depicted by the characteristics and costume of doll. The integrated timer switching device (210) in Section III activates the components in Section I controls Tape A to be mechanically driven across the reproduction head of the audio components in Section I in five second intervals, pre-recorded music with complete bilingual songs in five second segments are emitted through the amplifier equipment (120). The components in Section II duplicate those described in Section I and are controlled by the integrated timer switching device (210) in Section III to alternately record onto then emit sound recordings of child's voice from side one and/or side two of magnetic recording medium (70) in alternating five second segments; "Tape B". Tape B is synchronized by means of connection to the integrated timer switching device (210) in Section II to record a child's voice in five second segments. As the child listens to the first five second song segment emitted from Section I (Tape A) Section II (Tape B) is simultaneously in the timer off position. During the next five second alternating timer off/pause of Section I (Tape A), Section II (Tape B) is simultaneously in the timer on/record position allowing the child five seconds of time to repeat the five second song segment just heard from the instructor on Tape A. As the child continues to listen to the five second song segments emitted from Tape A, he or she alternately continues to record his or her own voice in five second song segments onto Tape B, thus recording full bilingual songs in successive five second segments. Once the recording is complete, single rewind button (90) is pressed to re-set both Tape A and Tape B so that when the play button (90) is pressed the child is delighted to hear in concert, full uninterrupted music with bilingual songs sung by the instructor from Tape A, along with his or her own version as recorded onto Tape B.

Because this type of analog recording medium retains its magnetic properties almost indefinitely and by means of automatic erasure just as the magnetic tape approaches the recording head of the audio components in Section II, the child has direct control over progress and can continually re-record onto Tape B. By repeating the process described above, the child can listen to numerous playback versions of his or her own voice for diction and pronunciation comparisons. As the child begins to absorb pattern recognition, he or she gradually develops a base for life long bilingual communication.

The Written Material (80), in the form of a small booklet, provides visual reinforcement. All printing is bilingual, written first in the American English language then immediately followed in the Component (60, 70) operational procedures, the material primarily contains written song lyrics in the Sequence recorded onto the Audio Magnetic Tape (Tape A, 70). By following each song word by word, the child becomes familiar with the written counterpart of the phoenetic sounds emitted from Tape A thus increasing his or her bilingual knowledge. To further encourage interest, also written are brief notes on the depicted Nation in relation to the field of music describing musical instruments, the achievements of composers and relevant information pertaining to music such as: Poetry and music have always been popular in Spain, many of the songs and poems of Spanish tradition are composed with themes of love . . . ; In Japan, dance and music are all prevailing, bringing color and joy to numerous festivals and ceremonies . . . ; Wolfgang Amadeus Mozart, the child genius from Salzburg performed his first concert at the age of six and spent his childhood on musical tours throughout Europe . . . .

Dolls of this character possess more realism in that the desire of children to imitate is a natural instinct. As children repeat and record the songs heard from Tape A (70), music with bilingual lyrics are unwittingly absorbed and the learning progress can continue with considerable variances. The audio magnetic medium (70) provided with each doll may contain two pre-recorded beginner level songs each sung in the American English language then immediately repeated in a language corresponding to the characteristics and costume of doll and may include music with educational lyrics such as: A, B, C, D, E, F, G . . . ; A, Be, Ce, De, E, Efe, Ge . . . (Spanish); one, two three, four, five, six, seven . . . ; ichi, ni, san, shi, go, roku, shichi . . . (Japanese); or Mary had a little lamb . . . ; Maria hat ein kleines lamm . . . (German). Song selections vary and may also be those originated in the Nation being depicted then immediately repeated in the American English language to provide familiar sounds and encouragement to immigrant children. Separately marketed Audio Magnetic Tapes (70) containing pe-recorded intermediate and/or advanced material enable children to easily approach what would be increasingly difficult material through other means. The method of teaching additional languages through song camouflages a serious subject requiring that multi-lingual educators be consulted to insure that without compromise, all aspects of teaching are considered including accurate translation and structuring of lyrics for easy learning progression. By utilizing the Audio Components (60, 70) described above, children can easily manipulate the device to repeatedly record onto or emit audible sound from numerous tapes at will, greatly reducing the time that a parent or instructor is required to spend teaching a second language to a child. This enables the child to explore language and music through participation and teaches that fun can include learning.

SUMMARY, RAMIFICATIONS, AND SCOPE

Accordingly, the reader will see that the Bilingual Educational Dolls of the present specification can be influential in teaching additional languages to children. Packaged for realism and play value, this series of dolls goes beyond child entertainment and facilitates teaching additional languages that maintains considerable educational value by providing:

* A means of intellectual interaction that is rewarding and stimulating.
* A method of teaching that retains the interest of children.
* Educational lyrics monitored by multi-lingual educators to ensure accurate translations and levels of comprehension by children.
* Song selections originated in various Nations to introduce music and bilingual lyrics to children of all nationalities.
* Beginner, intermediate and advance song structures built on known foundations to ensure continued learning progression.
* External positioning of Audio Components to allow the emission of clear, audible and educational sound.
* Challenge in its long term implication.
* Clothing creatively designed to resemble authentic National or Regional costumes as worn by children during festive and traditional events, enabling children to easily identify and become familiar with costumes specific to various Nations.
* Inexpensive dolls that entertain as well as convey the essence of bilingual communication.

Although the preceding descriptions contain many specifications, they should net be construed as limiting the scope of the specification but as providing some of the presently preferred embodiments. For example, economical considerations are made for the result achieved in describing the Audio Components with analog format however as advanced audio technology such as laser with digital format becomes cost effective, they may also be employed. And while pre-recorded information has been described to enable children to learn additional languages, pre-recorded information may be altered to provide speech therapy of fundamental reading skills to children of all ages. Thus, the scope of this specification should be determined by the attached claims and their legal equivalents rather than by the examples given.

What is claimed is:

1. A bilingual education doll apparatus for teaching a child a second language comprising:

a doll fashioned in a manner specific to the nationality of the language to be learned, an audio playback and recording means, integral with said doll comprising:

an audio mechanism having a pre-recorded sequential song with bilingual educational lyrics by an instructor;

a synchronized dual timer recording means, for activating said audio mechanism in a plurality of pre-determined timed segments;

means for pausing said audio mechanism for a time segment equivalent to each of said pre-determined timed segments;

a recording means;

means for activating said recording means for a time segment equivalent to each of said pre-determined timed segments, so a child may repeat and record said pre-recorded music with bilingual education lyrics;

wherein when said song is completed a playback of the instructors lyrics commences simultaneously with the child's recording.

* * * * *